United States Patent [19]
Oliver et al.

[11] 3,900,550
[45] Aug. 19, 1975

[54] METHOD OF ENHANCING FLEXURE OF PLASTIC HINGES

[75] Inventors: Bruce L. Oliver, Midland, Mich.; Ben W. Heinemeyer, Lake Jackson, Tex.

[73] Assignee: The Dow Chemical Company, Midland, Mich.

[22] Filed: Apr. 24, 1970

[21] Appl. No.: 31,690

[52] U.S. Cl. ............... 264/320; 220/339; 264/295; 264/339
[51] Int. Cl. .............................................. B29c 15/00
[58] Field of Search ................. 264/295, 320, 339; 220/315 R, 339

[56] References Cited
UNITED STATES PATENTS

| | | | |
|---|---|---|---|
| 3,184,524 | 5/1965 | Whiteford | 264/323 |
| 3,350,492 | 10/1967 | Grootenboer | 264/320 |
| 3,454,694 | 7/1969 | Delaire | 264/295 X |

OTHER PUBLICATIONS

"Poly-Pro" Polypropylene, written by Spencer Chemical Company, Dwight Building, Kansas City, Mo.

*Primary Examiner*—Richard R. Kucia
*Attorney, Agent, or Firm*—Richard G. Waterman; Michael S. Jenkins

[57] ABSTRACT

Plastic hinges having increased flexure longevity are formed by compressing a normally solid plastic member in the region of desired flexure at low temperature and at low compression rates to achieve cold flow of the plastic in the compressed region. The resulting plastic hinges are particularly useful in unimolded plastic containers.

9 Claims, 5 Drawing Figures

INVENTORS.
Bruce L. Oliver
BY Ben W. Heinemeyer

Griswold & Burdick
ATTORNEYS

METHOD OF ENHANCING FLEXURE OF PLASTIC HINGES

BACKGROUND OF THE INVENTION

This invention relates to a method for making plastic hinges useful in plastic containers and the like which require flexure areas.

The use of semi-rigid solid plastic material, e.g., solid molded olefin polymers, is increasing in the manufacture of containers and other articles where light weight, electrical resistance, corrosion resistance and other characteristics of these materials are desirable or required. In applications of such materials, it is often required to provide the plastic articles with flexure along predetermined lines.

It is well known to provide such flexure areas, e.g., hinges in sheets, strips, or slabs of plastic polymers by compressing or scoring the groove into the plastic sheets, etc., along the axis in which flexure is desired. Such techniques are often called post-forming and are usually effected by instantaneously stamping the groove at temperatures near or above the softening point of the polymer. "Cold stamping", wherein the polymer is cooled to ambient temperature and stamped instantaneously, i.e., at very high stamping speed, is also known.

Unfortunately instantaneous stamping, i.e., compression or scoring at high speeds, often weakens the plastic material in the flexure area such that repeated flexure causes the plastic sheet, strip, or slab to break along the groove.

In view of this problem it would be highly desirable to provide a method of making flexible hinges of semi-rigid plastic materials without substantial loss of tensile strength and thereby increasing flex life of such materials.

SUMMARY OF THE INVENTION

Accordingly, the present invention is a method for providing plastic hinges having improved tensile strength and increased flex life which comprises pressing a groove-forming die into a normally solid, thermoplastic, organic polymer at a rate less than about 2,000 mils/second, the temperature of the polymer being below the softening point of the polymer, preferably about ambient temperature. Practice of the method of this invention permits cold flow of the polymer in the flexure area, possibly resulting in densification of the polymer and thereby enhancing the tensile strength of the polymer in such areas.

Hinges or flexures provided by the present invention are suitably employed in many applications such as hinged cartons, containers, packaging cases, chests and the like, e.g., re-usable bottled and canned beverage cartons; also collapsible, re-usable boxes or cartons where flexure on the wall junction is desired; covers and bindings for books; hinges for doors, cabinets and the like; and hinges for toys, dolls, mannequins, and like articles of normally solid, thermoplastic organic polymer having a hinge and two generally rigid members extending outwardly therefrom.

DESCRIPTION OF THE PREFERRED EMBODIMENTS

Figure 1:
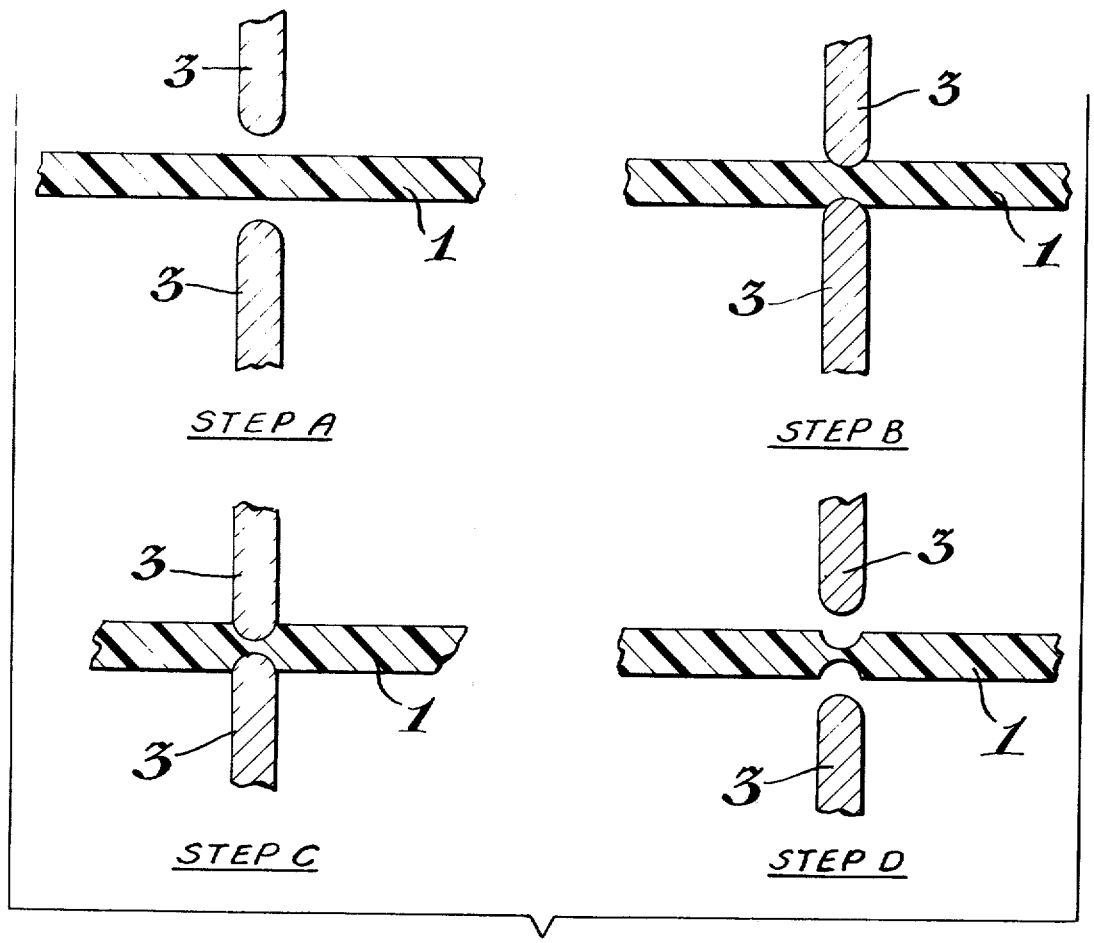
FIG. 1 is a sketch depicting by way of cross-sectional views sequential steps of the method of the present invention.

Referring now to the drawings, FIG. 1 shows, by way of a diagrammatical sketch, the method of the present invention in sequential steps. Step A depicts the molded slab 1 of suitable thermoplastic organic polymer properly positioned between groove forming dies 3 in open position. Step B depicts the stage wherein dies 3 are bearing on molded slab 1 with sufficient pressure to cause slight deformation thereof. Step C depicts the stage wherein dies 3 penetrate molded slab 1 to the maximum desired depth. Step D depicts the stage wherein dies 3 are withdrawn from the resulting grooved slab 1. Alternatively the method of the invention can be depicted in a similar sketch wherein one of the dies 3 is replaced with an anvil or similarly shaped member. The resulting hinge has a single instead of double indentation.

Plastic materials suitably employed in this invention are normally solid, thermoplastic organic polymers, preferably normally solid, olefin polymers. By the term "normally solid, olefin polymers" is meant molding or extrusion grade polymers of $\alpha$-olefins such as ethylene, propylene, butylene and the like which are in solid state at ambient temperature. Of particular interest are polyethylene, polypropylene, copolymers of ethylene and propylene, and copolymers of ethylene and/or propylene with minor amounts of other copolymerizable monomers having $\alpha,\beta$-unsaturation. Examples of such monomers include the $\alpha$-olefins; $\alpha,\beta$-ethylenically unsaturated carboxylic acids such as acrylic and methacrylic acid; alkyl esters of such $\alpha,\beta$-ethylenically unsaturated acids; vinyl esters of saturated carboxylic acids such as vinyl acetate; vinyl compounds such as acrylonitrile, vinyl chloride, and acrylamide; vinylidene compounds such as vinylidene chloride; dienes such as butadiene and isoprene; styrene compounds and substituted styrenes. Of greatest interest are molding grade polyethylenes, polypropylenes and interpolymers of ethylene and/or propylene with minor amounts of other copolymerizable monomers. Suitable plastic materials optionally contain additives such as solid pigments or fillers, stabilizers, antioxidants, plasticizers, colorants, dyes and the like.

A molded slab of normally solid thermoplastic organic polymer for the purposes of this invention is a molded, extruded, or otherwise shaped article. Generally the molded slab can be of any shape, size or the like except that it is desirable that the area wherein flexure is to be formed has a thickness generally of about 10 mils to about one fourth inch, preferably from about 1/30 inch to about one eighth inch. Suitable molded slabs are formed by any conventional method for shaping thermoplastic polymers.

Figure 2:
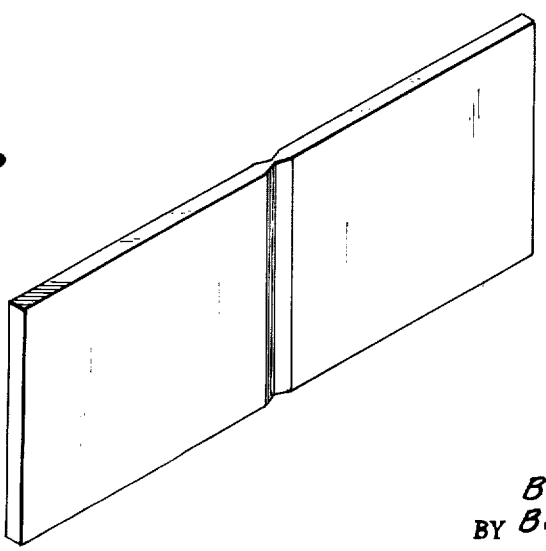
FIG. 2 is an isometric view of a typical hinge provided by this method.
Figure 2A:
FIG. 2A is a cross-sectional view of the hinge of FIG. 2.

In practicing this invention, the flexure area is formed by compressing a groove or indentation into the molded polymer with a groove-forming die so that the thickness of the material in the compressed area is from about 60 to about 10%, preferably from about 50 to 20%, of its original thickness. It is understood that compression or indentation may be carried out in such a way that one or both sides of the polymer sheet is deformed, depending on the die configurations. Illustratively, referring to FIGS. 2, 2A and 3, only one side of the polymer slab or both sides may be indented along the axis of flexure.

It is critical for the purposes of this invention that the rate of compression of the die or dies into the polymer be less than about 2,000 mils/second, preferably less than about 1,000 mils/second, especially from 5 to 1,000 mil/sec. In instances wherein the polymer is high density polyethylene, having a melt index from about 0.1 to about 20 decigrams/minutes as determined by ASTM D-1238--65T(E), such as prepared by Ziegler- or Phillips-type catalysts, it is preferred to limit the compression rate of the die to less than about 500 mils/second. In especially preferred embodiments, the compression rate is from about 5 to about 300 mils/second.

The temperature of the polymer slab at the time of compression should be substantially below the melting point of the polymer, preferably below the softening point of the polymer. In embodiments wherein olefin polymers are employed, the temperature of the polymer at the time of compression is preferably within the range of from about 60° to about 140°F, preferably at temperatures from 70° to 90°F. It is therefore desirable to allow the polymer slab to cool after fabrication, e.g., injection molding, before the hinge forming die is compressed into the polymer slab.

It is understood, however, that it is only the temperature of the polymer which is critical and that dies heated to temperatures up to about the softening point of the polymer or slightly above can be employed as well as unheated dies. It is believed that the use of heated die or dies does not prevent the cold flow of the compressed polymer which is necessary because the heated dies are in contact with the polymer only long enough to heat the surface of the polymer, thus reducing the friction between the polymer surface and the die surfaces. In instances wherein the die or dies are preheated, they are preferably preheated to a temperature in the range of from about 150° to about 210°F.

Dies suitably employed in the practice of this invention include punch dies driven at the desired rate of travel by pneumatic or hydraulic force. When dies of this type are employed, the compression is built up at a rate which is just sufficient to cause deformation of the polymer. As further pressure is increasingly applied, the deformation continues until the desired amount of deformation is attained. The rate of deformation is suitably controlled by the rate at which the pressure is increasingly applied. Thus by controlling the compression force, the compression rate is controlled such that the overall rate is not greater than 2,000 mils/second. In instances wherein the punch dies are operably attached to a mechanical-torque press, the rate of compression is controlled by mechanically or automatically gearing the press to attain the desired speed of die travel.

The following examples are given to illustrate the invention and should not be construed as limiting its scope. In the following examples, tensile strengths (given as pounds per square inch) are measured in accordance with the procedure of ASTM D-638-68, and tensile impacts (given as foot pounds per square inch) are measured in accordance with the procedure of ASTM D-1822-68. In addition all parts and percentages are by weight unless otherwise indicated.

EXAMPLE 1

Figure 3:
FIG. 3 is a cross-sectional view of a hinge having indentation on one side of polymer article.
Figure 4:
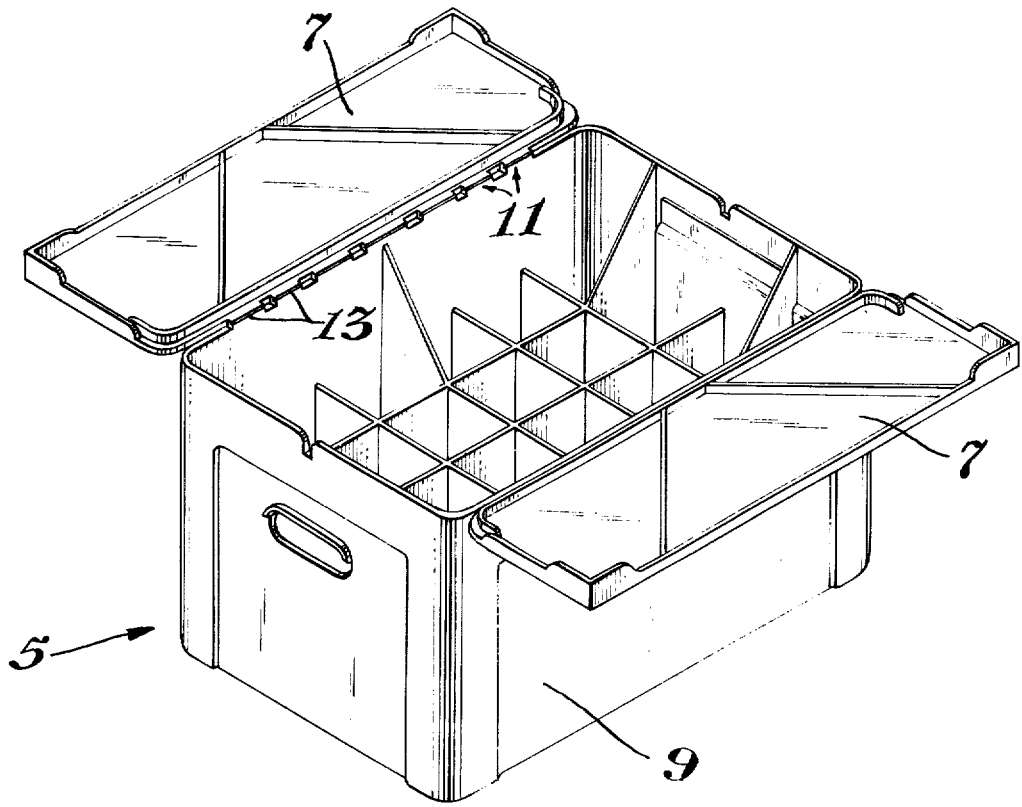
FIG. 4 is an isometric view of a bottled beverage carton employing the hinge of type illustrated in FIG. 3.

Containers in the nature of bottled-drink cases as depicted in FIG. 4 of the drawings of two different olefin polymers are injection molded in a mold designed to form cases 5 having two opposed lid portions 7 integrally attached to the body of each case, each lid portion being attached to a side 9 of the case by seven slab portions 11 aligned along the upper edge of the side of the case. As originally molded, the defined slab portions 11 of each case have a uniform thickness of 75 mils and are from about seven eighths to 2 inches long (along the axis of the desired flexure area) and about one eighth inch wide (measured between the body and lid portions of the case). The cases are allowed to cool to 70°F and grooves 13 are post-formed in the slab portions by compressing a die preheated to 190°–210°F and shaped to give a groove (arcuate in cross section) about 0.1 inch wide into the polymer slab portions 11 at a rate of from about 200 to 300 mils/second. The resulting hinge is from about 18 to about 25 mils thick at its thinnest portion. The configuration of each hinge area (in cross section) is substantially as illustrated in FIG. 3. Samples are cut from each of the seven hinges that join a lid portion with a side of the cases and tensile impact tests are made on each sample. Tensile impact is recorded in Table I as the average tensile impact strengths of the seven slab portions or hinges.

For the purposes of comparison, control runs ($C_1$ and $C_2$) are made employing bottled-drink cases of one of the two olefin polymers used in the preceding runs. Injection molding of the cases is carried out in a similar manner. Grooves are also formed in the slab portions connecting the lids to the sides of the cases of the control runs by compressing a die as used hereinbefore into the polymer slab portions at a compression rate greater than 2,000 mils/second. The resulting hinges are also about 18 to 25 mils thick at their thinnest portions. Samples are also cut from each of the seven hinge portions of the control run cases and tensile impact tests are made on each sample. The tensile impact strengths of the hinges are reported in Table I as the average tensile impact strength of seven hinges tested.

TABLE I

| Sample Run No. | Polymer Used (1) | Pigment, % (2) | Compression Rate mils/sec | Tensile Impact, ft-lbs/in² | |
|---|---|---|---|---|---|
| | | | | Front** | Rear** |
| 1 | A | No | 200–300 | 149 | 167 |
| 2 | A | Yes | 200–300 | 134 | 139 |
| 3 | B | Yes | 200–300 | 100 | 105 |
| $C_1$* | A | No | >2000 | 97 | 76 |
| $C_2$* | A | Yes | >2000 | 73 | 78 |

*Not an example of this invention in respect to compression rate.
**In this and subsequent tables, "Front" means the hinges are near the front of the mold and the same side from which the operator removes the case from the injection molding machine; and "Rear" means hinges are formed near rear of mold on side opposite of "Front".
(1) Polymer A = an ethylene homopolymer having a density of 0.967 and a melt index of 8.0 decig/min as determined by ASTM D-1238-65(T) Condition E.

TABLE I-Continued

| Sample Run No. | Polymer Used (1) | Pigment, % (2) | Compression Rate mils/sec | Tensile Impact, ft-lbs/in² Front** | Rear** |
|---|---|---|---|---|---|

Polymer B = a blend of 45 percent of an ethylene propylene copolymer having a density of 0.950 and a melt index of 8.0 decig/min with 55 percent of an ethylene homopolymer having a density of 0.967 and a melt index of 8.0 decig/min, said blend having a density of 0.957 and a melt index of 8.0 decig/min.

(2) "Yes" means a polymer containing 1.3 percent of a brown pigment.
"No" means a polymer containing no pigment.

EXAMPLE 2

In order to illustrate that dies heated to a variety of different temperatures can be employed in the practice of this invention, the following run samples are carried out using heated dies at variable temperatures. Bottled-beverage cases are injection molded as in Example 1. Grooves are formed in the slab portions using an air-stamper operating at a compression rate between 200 and 300 mils/sec, the temperature of the polymer being about 70°F. The bottled-drink cases are molded of high density polyethylene having a melt index of 8 decig/min and a density of 0.958. Average tensile strength and tensile impact of seven hinges along the same side of each bottled-drink case are recorded in the following Table II.

TABLE II

| Run No. | Die Temperature °F. | Tensile Strength, lb/in² | Tensile Impact, ft-lbs/in² |
|---|---|---|---|
| 1 | 75 | 6,275 | 104.3 |
| 2 | 150 | 15,402 | 136.3 |
| 3 | 170 | 17,008 | 148.2 |
| 4 | 190 | >17,500 | 159.0 |
| 5 | 210 | >17,500 | 161.0 |

EXAMPLE 3

Bottled beverage cases are prepared in accordance with Example 1 except the polymer slabs are at a temperature of 100°F and different polymers are employed. Grooves are formed in the polymer slab connecting portions having temperature of 100°F as in Example 2 using an air-stamper die preheated to 190°–210°F and operating at die speeds from 200 to 300 mils/sec. Values of tensile impact are given in Table III as an average of tensile impact strengths of seven hinges along one side of the case.

For the purposes of comparison, control runs ($C_3$ and $C_4$) are carried out wherein grooves are formed in connecting polymer portions of cases essentially the same as those of Example 3 using die speeds of greater than 2000 mils/sec. Tensile impact strengths for these controlled runs are given in Table III as an average of tensile impact strengths of seven hinges along one side of case.

TABLE III

| Run No. | Polymer (1) | Pigment | Compression Rate mils/sec | Tensile Impact Strength, ft-lbs/in² Front** | Rear** |
|---|---|---|---|---|---|
| 1 | D | No | 200–300 | 85 | 84 |
| 2 | D | Yes | 200–300 | 85 | 84 |
| $C_3$* | D | No | >2000 | 66 | 70 |
| $C_4$* | D | Yes | >2000 | 63 | 73 |

*Not an example of the invention in respect to compression rate.
**Same as in Table I.
(1) Polymer D = an ethylene/propylene copolymer having a density of 0.958 and a melt index of 8.0 decig/min.

EXAMPLE 4

Several bottled beverage cases of Polymer D are formed in accordance with the procedure of Example 3 using compression rate ranging from 200 to 300 mils/sec. The resultant hinges are flexed in a machine which bend the hinges through an angle of 150°. Average tensile impact strength of seven hinges of a single case after different numbers of flexes are given in the following Table IV.

TABLE IV

| | | Tensile Impact Strength, ft-lbs/in² | | | |
| | | Number of Flexes | | | |
| Example No. | Polymer (1) | 0 | 500 | 1000 | 1500 |
|---|---|---|---|---|---|
| 4 | D | 84 | 69 | 49 | 49 |

(1) Same as in Table III.

For the purpose of comparison a control run is carried out employing several bottled beverage cases of Polymer D wherein the hinges are formed at compression rates greater than 200 mils/sec and the resulting hinges are flexed as above. The average tensile impact strengths of the hinges of the control run after a specified number of flexes are significantly lower than the hinges prepared in accordance with Example 4.

In similar tests of other olefin polymers (both pigmented and non-pigmented) similar results are found wherein hinges formed at a slow rate of compression, i.e., at a die speed of less than about 2,000 mils/sec, are stronger and have a greater flex life than hinges formed at usual rapid rates of compression, i.e., at die speeds in excess of 2000 mils/sec. In such instances stronger hinges are obtained with any conventional die design. For example, the die may have a rounded, very blunt profile or a more pointed profile.

What is claimed is:

1. A method for providing plastic hinges having improved tensile strength and increased flex life which comprises compressing a groove-forming die into a normally solid, thermoplastic organic polymer at a compression rate less than about 2000 mils/second, the temperature of the polymer being below the softening point thereof.

2. The method according to claim 1 which comprises compressing a groove forming die into a normally solid, olefin polymer at a compression rate less than about 2000 mils/second, the temperature of the polymer being below the softening point thereof.

3. The method according to claim 2 wherein the polymer is a high density polyethylene having a melt index in the range from about 0.1 to about 20 decigrams/minute and the compression rate is from about 5 to about 1000 mils/second.

4. The method according to claim 3 wherein the compression rate is less than 500 mils/second.

5. The method according to claim 4 wherein the compression rate is from 200 to 300 mils/second.

6. The method according to claim 1 wherein the groove-forming die is preheated to a temperature in the range from about 75°F to about 210°F.

7. A plastic hinge provided by the method of claim 1.

8. The method according to claim 1 wherein the temperature of the polymer is within the range from about 60° to 140°F.

9. The method according to claim 1 wherein the temperature of the polymer is within the range from about 70° to 90°F.

* * * * *